Figure 4:
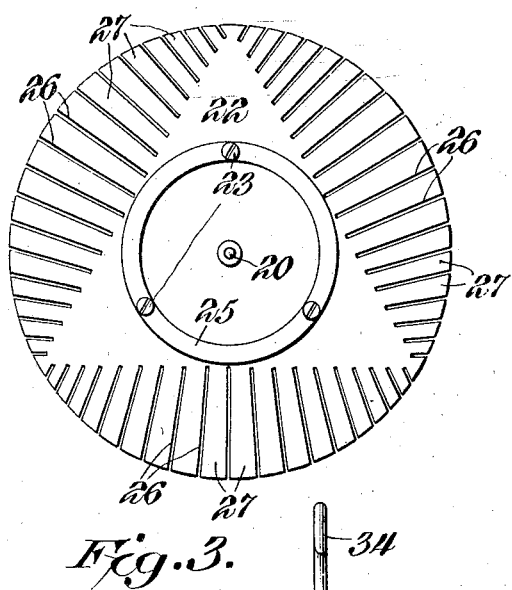

A. PLECHER.
TELEPHONE RECEIVER.
APPLICATION FILED MAR. 29, 1912.
1,110,228.
Patented Sept. 8, 1914.
3 SHEETS—SHEET 1.
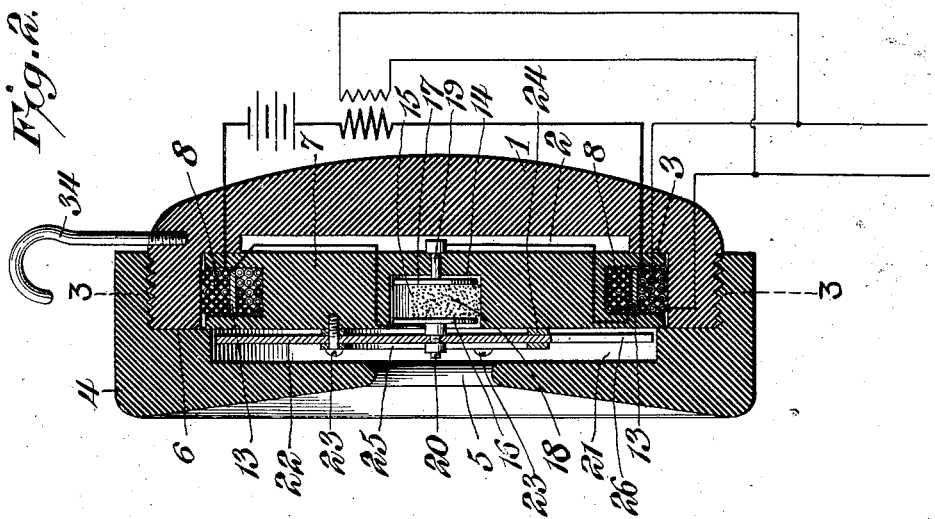
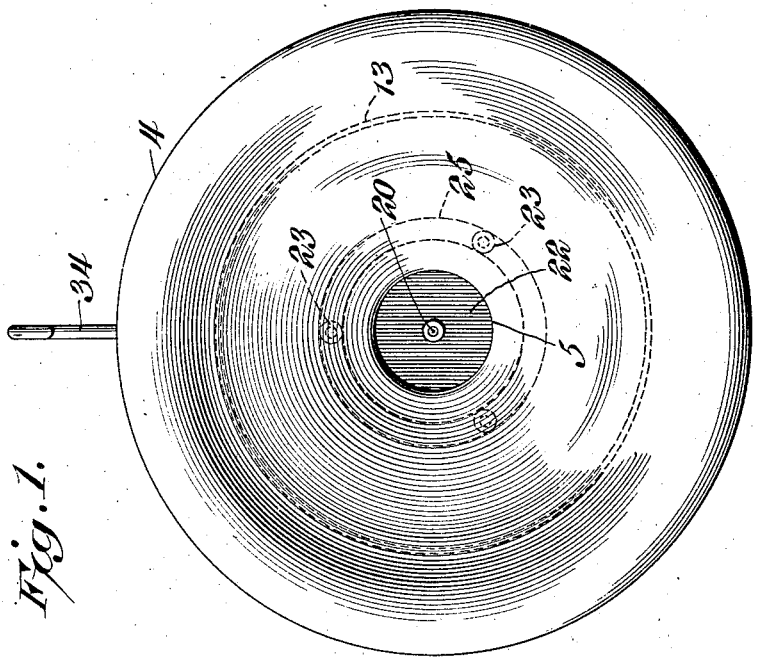
WITNESSES
Howard D. Orr
F. T. Chapman
Andrew Plecher, INVENTOR,
BY E. G. Siggers
ATTORNEY

A. PLECHER.
TELEPHONE RECEIVER.
APPLICATION FILED MAR. 29, 1912.

1,110,228.

Patented Sept. 8, 1914.

3 SHEETS—SHEET 2.

WITNESSES
Howard D. Orr.
F. T. Chapman.

Andrew Plecher, INVENTOR,
BY C. G. Siggers
ATTORNEY

A. PLECHER.
TELEPHONE RECEIVER.
APPLICATION FILED MAR. 29, 1912.
1,110,228.
Patented Sept. 8, 1914.
3 SHEETS—SHEET 3.
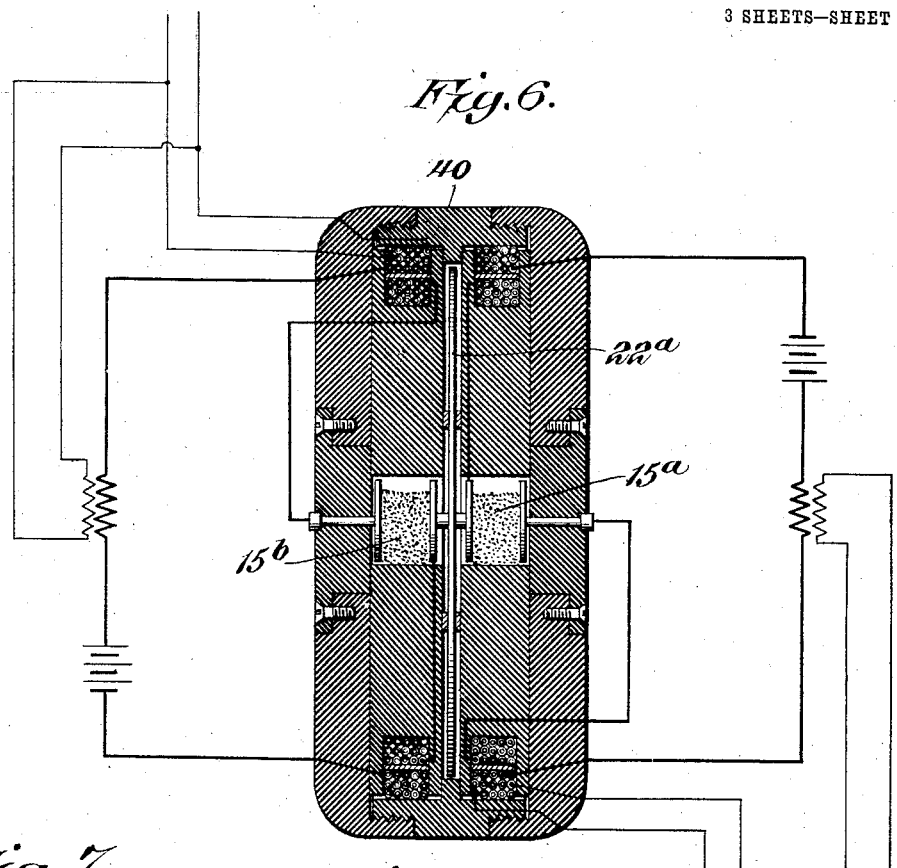
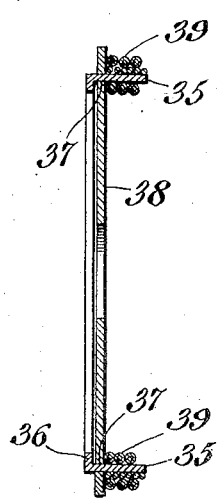
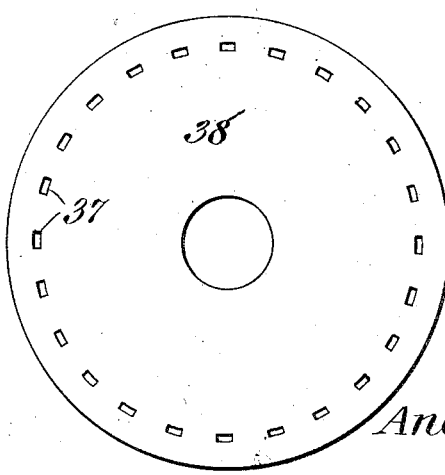
Andrew Plecher,
INVENTOR,
WITNESSES
BY
ATTORNEY

UNITED STATES PATENT OFFICE.

ANDREW PLECHER, OF LAS ANIMAS, COLORADO.

TELEPHONE-RECEIVER.

1,110,228.  Specification of Letters Patent.  Patented Sept. 8, 1914.

Continuation of application Serial No. 606,298, filed February 3, 1911. This application filed March 29, 1912. Serial No. 687,066.

*To all whom it may concern:*

Be it known that I, ANDREW PLECHER, a citizen of the United States, residing at Las Animas, in the county of Bent and State of Colorado, have invented a new and useful Telephone-Receiver, of which the following is a specification.

This invention has reference to improvements in telephone receivers, and its object is to provide a receiver of markedly greater sensitiveness to electric impulses coming over the line than are the receivers ordinarily in use, while at the same time the choking effect present in the ordinary receivers is eliminated.

In accordance with the present invention there is provided a receiving magnet, preferably of annular form in conjunction with a receiving diaphragm preferably supported by a circularly arranged fulcrum intermediate of the inner and outer portion of said diaphragm, with the magnet effective particularly adjacent to the periphery thereof. Moreover, the diaphragm acts on a microphonic element and the magnet is provided with a coil having the microphonic element in circuit therewith and both in operation are charged by a source of current so that line impulses act upon the diaphragm through the electro magnet to set the diaphragm in vibration, and this vibration causes a corresponding variation in resistance to the local circuit in the microphonic element, thereby highly affecting the current which sets up the magnetism in the receiving coil to in turn act upon the diaphragm, the receiving coil also acting in conjunction with any other coil in the circuits. The result of this is that the incoming impulses are reinforced and the diaphragm is always, according to line impulses, loudly and distinctly vibrated, which is not the case in the ordinary commercial receivers.

In the common commercial forms of telephone receivers the diaphragm is clamped at the margin, and is otherwise superficially free, the receiving magnet acting upon the central portion of the diaphragm. Such diaphragms are notoriously unresponsive to those overtones or corresponding electrical impulses to which the quality of sound known as timbre is due. In accordance with the present invention the diaphragm is so constructed that it is particularly sensitive not only to vibrations or impulses corresponding in rate to those of the speaking voice, but to the overtones or harmonics, the diaphragm being provided with numerous sections or segments sympathetically responsive each to a rate of vibration differing from other sections, and these sections are sufficiently numerous to present one or more sections having a natural rate of vibration corresponding to an overtone to move with greater amplitude than otherwise, for the reason that it vibrates in sympathy with such overtone. The many diaphragm portions or segments provided practically cover the range of vibration of the speaking voice inclusive of the fundamental rates and the rates of vibration of the overtones or harmonics. The choking effect of the coil in conjunction with the reacting of the diaphragm armature and the muffling of the vibrations of the diaphragm of the ordinary receiver due to the faulty construction thereof is eliminated by the present invention where the diaphragm vibrates with markedly increased amplitude in response to the received impulses to thereby reproduce the transmitted sound naturally, clearly and loudly.

The invention will be best understood from a consideration of the following detailed description, taken in connection with the accompanying drawings forming a part of this specification, with the further understanding that while the drawings show the invention in part in practical form and in part diagrammatically, the invention is susceptible of other arrangements than those illustrated, wherefore it is not confined to any strict conformity with the showing of the drawings in its practical form, but may be variously changed and modified so long as such changes mark no material departure from the salient features of the invention.

Figure 3:
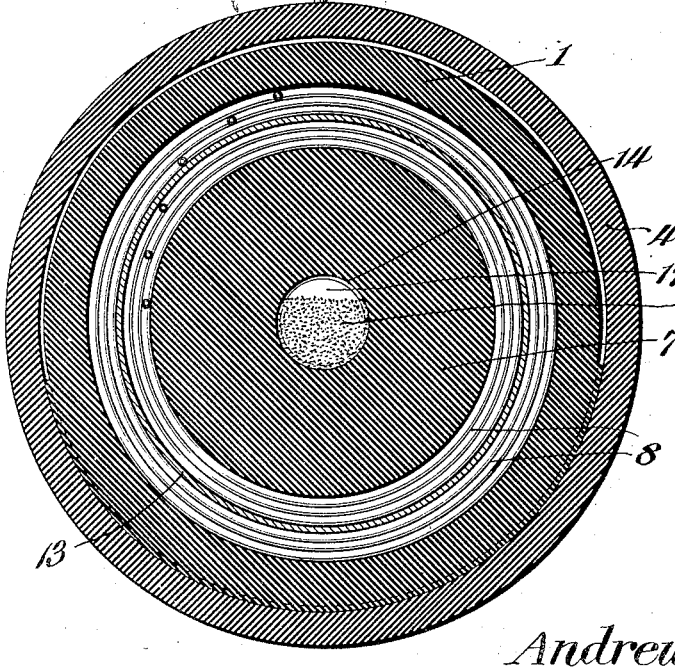
Figure 5:
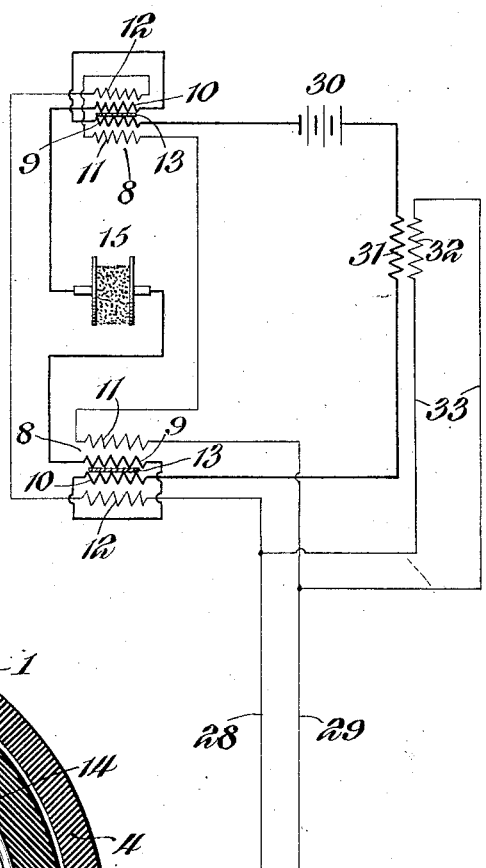

In the drawings:—Figure 1 is a front elevation of the receiver. Fig. 2 is a central section through the receiver taken from front to rear. Fig. 3 is a fragmentary section on the line 3—3 of Fig. 2. Fig. 4 is a face view of the diaphragm. Fig. 5 is a diagram of the circuit connections. Fig. 6 is a sectional view of a modified form of the device. Fig. 7 is a sectional view of a modified form of core for the receiving magnet.

Fig. 8 is a face view of a portion of the structure shown in Fig. 7.

In the practical embodiment of the invention the receiver may, so far as its external appearance is concerned, follow the lines of the ordinary telephone receiver, but for convenience of illustration the invention is shown as embodied in a more compact form than that of the ordinary receiver provided with an axial elongated hand-hold.

Referring more particularly to the drawings there is shown a body member 1 of circular form, and which is usually made of hard rubber or some similar composition commonly employed in telephone instruments. The body member is formed with a centrally disposed chamber 2 opening at what may be termed the front of the body member, and there enlarged in diameter to provide an annular ledge 3. The exterior of the body member near the open end thereof is appropriately screw-threaded for the reception of a cap 4 having a central passage 5 opening toward the body member 1, the cap 4 conforming generally to the usual mouth pieces of telephone receivers. The inner face of the cap member 4 is provided with an annular shoulder 6 designed to engage against the body member 1 and to a small extent overlap that portion of the chamber 2 diametrically enlarged to form the ledge 3.

Lodged in the chamber 2 is a spool 7 of appropriate material, such as hard rubber or any suitable like composition, or any other non-magnetic material appropriate for the purpose. The spool 7 is designed to receive a coil, indicated generally at 8, but which in fact comprises four coils 9, 10, 11 and 12 with an intermediate core 13, which latter because of the character of the currents traversing the coils surrounding it may be of a laminated nature, the word laminated being used in a broader sense as inclusive of either sheets, strips, rods or wires of magnetic material. The coil 8 may be conveniently formed by first winding upon the spool 7 the coil 11, then upon the latter the coil 9, then placing the core 13 upon the coil 9, which core may be wound upon the coil 9 when the core is formed of iron wire or bands or strips of iron. The coil 10 is then wound upon the core, and finally the coil 12 is wound upon the coil 10, it being understood that due insulation is provided throughout. Centrally in the spool 7 there is provided a cavity 14 for the reception of a microphonic element 15, which latter may be of the solid back transmitter type or any other desired type of microphonic element adapted to the purposes of the present invention. The showing of the drawings with respect to the microphonic element is more or less schematic, and as indicated, has a front plate 16, a back plate 17 and a mass 18 of granules. The back plate 17 is held in the cavity 14 by a suitable stud 19 and the front plate 16 carries a suitable stud 20.

The spool 7 is firmly lodged on the ledge 3 of the cavity 2 by the shoulder 6 of the cap 4 engaging the spool close to the edge thereof, while the inner face of the cap 4 is sufficiently distant from the front face of the spool 7 when in place to provide a chamber 21. Fast to the spool 7 is a diaphragm 22 which may be somewhat heavier and more elastic than the diaphragms ordinarily in use, and this diaphragm is attached at the center to the front plate 16 of the microphonic element by the stud 20 and appropriate fastening devices, such as are commonly employed in securing a diaphragm to a microphonic element in the telephone art and therefore need no particular description.

At points between the cavity 14 and the outer edge of the diaphragm 22 the said diaphragm is secured to the spool 7 by screws 23, or other appropriate fastening devices with a ring 24 between the inner face of the diaphragm and the adjacent face of the spool 7 and another ring 25 on the outer face of the diaphragm, the screws 23 clamping the diaphragm through the intermediary of the rings 24 and 25.

The diaphragm 22 is best shown in Fig. 4 and about its periphery this diaphragm has numerous inwardly directed slits 26 which in the particular arrangement shown in the drawings are assembled in three groups, each including an arc of about one hundred and twenty degrees, it being understood that the diaphragm is a circular disk and these slits are longest at the intermediate portion of the arc and decrease in length toward the ends of the arc, terminating approximately at the chord joining the ends of the arc. The three zones of slits are produced about a substantially equi-lateral triangular included portion of the diaphragm. The slits in the particular showing of Fig. 4 are substantially radial to the respective apex of the triangle opposite the base from which the slits of any particular zone of slits extend. The result is that the portions of the diaphragm between any adjacent slits form tongues having their bases integral with the unbroken triangular portion of the diaphragm, and their free ends at the periphery of the diaphragm, the tongues expanding toward the free ends. The tongues of any zone are progressively shorter from the central portion of the arc to the ends thereof and may also diminish in width, so that their natural rate of vibration is correspondingly increased.

An arrangement such as described is employed in practice, although the practical form of the invention need not follow with any particular exactitude the showing of Fig. 4, if the tongues or reeds indicated at 27 are properly tuned to be sensitive each to a predetermined rate of vibration so that when complex electrical impulses such as are caused by transmitted speech produce magnetic fluctuations in operative relation to the diaphragm 22, which, of course, is of magnetic material, some one or more of the tongues 27 will energetically respond each to some one of the impulse components, thus greatly reinforcing the effect of each and every rate of vibration within the range of the tongues 27. These vibrating tongues set the air within the chamber 21 into vibration by lever action on the central solid portion and the air waves thus produced pass out through the opening 5 to the ear of the listener. Since the diaphragm has portions particularly sensitive not only to the lower tones or fundamentals of the transmitted speech waves in the form of electrical impulses, but to a sufficiently great number of the harmonics or overtones, the latter are greatly strengthened instead of being in part or wholly obliterated and the reproduced sound reaching the ear of the listener is sensibly faithful to the originally uttered sound at the distant transmitter.

It is to be further observed from the showing of Fig. 4 that the screws or fastening devices 23 for the diaphragm are likewise disposed one hundred and twenty degrees apart and each is located in a perpendicular bisector extending from a corresponding vertex of the triangular section of the diaphragm to the base opposite such vertex, such perpendicular bisector passing through the center pin or stud 20 securing the diaphragm to the front plate of the microphonic element. The fastening devices 23 have each a practically solid support in the spool 7, so that vibrations imparted to the outer portion of the diaphragm which is there free from any support whatsoever are transmitted to the central portion of the diaphragm where the latter is connected to the microphonic element, as though by a multitude of levers having their fulcrums in the rings 24 and 25. The central portion of the diaphragm not only acts as a solid diaphragm to set the air in vibration in accordance with the vibrations of the active tongue or tongues, but the microphonic element is correspondingly agitated to produce variations of resistance in the circuit controlled thereby and the pulsating current thereby caused reacts through the coils 9 and 10 to produce magnetic impulses in turn acting upon the diaphragm to amplify its vibrations initially produced by the incoming line impulses.

The circuit connections are best shown in Fig. 6. The line conductors are indicated at 28, 29, and are assumed to come from some distant transmitting point. The coils 11 and 12 are connected together in series and are connected in series to the line conductors 28 and 29, while the coils 9 and 10 are connected one to one plate of the microphonic element and the other to the other plate thereof, and these two coils on the sides opposite to those connected to the microphonic element are connected together in series and in series with a battery 30 or other source of electric current local to the receiver, so that so far as the microphonic element is concerned it is connected up in series with the windings 9 and 10 in a local circuit including the local source of current, wherefore the circuit may for convenience of description be considered as a local circuit. The windings 11 and 12 are connected up in series with the line conductors 28 and 29, and the combined winding may, therefore, be termed the line winding or coil. Included in the local circuit is a primary winding 31 of an induction coil such as is commonly used in telephone installations, and this induction coil has a secondary winding 32 connected by conductors 33 to the respective line wires 28 and 29 in multiple with the combined windings 11 and 12. While the microphonic element with the diaphragm connected thereto has an important function in connection with the instrument as a receiver it may also be utilized as a transmitter, in which case the induction coil having the windings 31 and 32 comes into service in the usual way. It will be understood, of course, that the usual cutting out switches employed in telephone installations are used in connection with the present invention, but have not been shown, since they form no part of this invention. The receiver is provided with a hook 34 by means of which it may be suspended from the ordinary telephone hook or like device cutting out the receiver or local battery when the receiver is not in use and is "hung up."

The annular receiver coil comprising the windings 11 and 12 is combined with the local coil made up of the windings 9 and 10, and these two coils constitute an induction coil for which the microphonic element operates in some degree like a circuit breaker for the induction coil. It is due to the fact that fewer turns are necessary in the receiver magnet of the present invention than in the receiver magnets of ordinary receivers and to the construction of the diaphragm and the close relation of the local and secondary windings of the receiver coil that the chocking effect prominent in ordinary receivers is so markedly eliminated in the present device.

The microphonic element in the local battery circuit in series with the local magnetic winding produces a state of unstable equilibrium so that the incoming line impulses can most readily modify the local current and thereby the magnetic effect acting on the diaphragm, wherefore the diaphragm is not only more forcibly attracted but is promptly released after having been attracted and to a greater extent as though a kick had been imparted to the diaphragm.

The multi-resonant diaphragm should, for the best results, be made in accordance with strict and well known principles of acoustics, so that the tongues or segments vibrate in accordance with the components of sound or harmonics. However, even if they are approximately correct the tongues are more readily impressed by forced vibrations than are diaphragms as ordinarily constructed, and the improved diaphragm will give better results on the ordinary telephone than the diaphragm commonly in use. The marginal portion of the diaphragm is wholly free to vibrate under magnetic influences, while the components of the transmitted sounds are received individually and compounded in the reproduction into a component sound, or if not compounded, left a simple sound, just as the case may be, this being brought about by the simultaneous vibrations of parts or segments in tune or approximately in tune with the transmitted impulses, whereby both the fundamentals and overtones of the sounds are augmented and reach the ear of the listener.

Long experience has demonstrated that the diameter of the receiver diaphragm of the commercial types of receivers cannot be increased without a serious diminishing of the efficiency, and, furthermore, experience has taught that the magnets in use in ordinary commercial telephone receivers, since they are permanently magnetic, cannot be regulated, controlled or tuned in any way. The present invention has the advantage over the ordinary commercial receiver in that the diaphragm may be quite largely increased in diameter with an increased leverage and magnetic pull, thus markedly improving the efficiency. Moreover, in the receiver of the present invention the magnetism is under absolute control and can, therefore, be regulated and tuned in different known ways.

With respect to the windings upon the spool 7, it is not necessary that they should be in concentric layers, for they may be wound side by side in the direction of the longitudinal axis of the spool without material departure from the salient features, although with a marked change in the result, that is, a loss of magnetic tuning.

Instead of a substantially ring-shaped core for the receiver magnet, the structure of Figs. 7 and 8 may be employed. In this arrangement a continuous series of pins or studs 35 project laterally from a ring 36, the pins and ring being made of soft iron, and these pins project through suitable openings 37 in a disk 38 which may represent a head or end of the spool 7. In this case the magnetic core may be in the form of a wire winding 39 interwoven about the pins 35 or simply wound about a series of pins as a support.

For some purposes the invention is operable with other arrangements for locally producing magnetic conditions active to the diaphragm and responsive to the variable impulses transmitted over the main line.

Practice has demonstrated that the receiver coil is more effective than receiver coils as ordinarily constructed, because of the greater amount of wire exposed to induction, there being in the annular coil an inner secondary and an inner primary, together with an outer secondary and an outer primary.

When the instrument is used as a transmitter the receiver winding coacts with the secondary of the induction coil, but when the arrangement is used as a receiver the exterior induction coil when of the ordinary type will act as a choke coil forcing the line current through the receiver coil and the local current will then merely maintain permanent magnetism in the locally charged coil, which magnetism is, of course, modified by the line current.

The receiver herein described is particularly adapted for tuning to the voice or instrument and also part to part, acoustically, electrically and magnetically, wherefore it becomes possible with the receiver herein described to tune the whole telephone circuit and all parts thereof in which the receiver is installed, thus permitting the utilization of all the energy of the circuit harmoniously.

The microphonic element acts in a manner similar to the detector or coherer in wireless systems. When the line impulses induce a current in the local microphone circuit of the receiver, and the current so induced flows in the same direction as the local unidirectional current, then, and then only, such induced current bridges the microphonic element and carries the local direct current with it through the microphonic element, whereas when the line impulses induce a current in the contrary direction to the local unidirectional current then such contrary induced current is checked and neutralized by the local direct current. The result of this action is that the diaphragm is loudly and distinctly vibrated in accordance with the line impulses in contradistinction to the action of the ordinary commercial receivers.

The invention is adapted for use as a relay or repeater. For this purpose two receivers may be included in a single body member 40, as shown in Figure 6, this body member carrying a diaphragm 22ᵃ connected at its center to microphonic elements 15ᵃ and 15ᵇ on opposite sides thereof, the receiver structure remaining as before. The line circuits are duplicated, as indicated in Fig. 6, so that the relay or repeater will connect up the two lines in a manner usual in instruments of this class.

This application is a continuation of an application Serial No. 606,298, filed by me on February 3rd, 1911, for improvements in telephone receivers.

What is claimed is:—

1. A telephone receiver provided with a diaphragm having central and marginal vibratory portions with a support between said central and marginal portions and with the marginal portion wholly free, and a magnet in inductive relation to the marginal free portion of the diaphragm.

2. A telephone receiver provided with a diaphragm having central and marginal vibratory portions with a support between said central and marginal portions and with the marginal portion wholly free, and a magnet in inductive relation to the marginal free portion of the diaphragm, said magnet being of annular form and constructed to act on the diaphragm adjacent the periphery thereof.

3. In a receiver, a diaphragm provided with a support between the central and marginal portions and having its marginal portions free to vibrate, an electro-magnet in inductive relation to the free marginal portions of the diaphragm, circuit controlling means connected to the central portion of the diaphragm and adapted to be included in a local charged circuit, and a coil included in circuit with the circuit controlling means and located in inductive relation to the magnet controlling the diaphragm.

4. A telephone receiver provided with a diaphragm having a microphonic element connected to the central portion of the diaphragm with the marginal portions of the diaphragm wholly free to vibrate, and an induction coil in inductive relation to the marginal, freely vibratory portions of the diaphragm with one winding adapted to be connected to a line circuit and the other winding included in the circuit with the microphonic element and adapted to be connected up to a local charged circuit.

5. In a telephone receiver, a diaphragm provided with peripheral tongues tuned to respond to different rates of vibration, and a magnet in inductive relation to said tongues.

6. In a telephone receiver, a diaphragm having marginally located freely vibratory tongues having different natural rates of vibration, and a magnet in inductive relation to said tongues.

7. In an acoustical instrument, a circular diaphragm provided with peripherally located, freely vibratory tongues in zones with the tongues of each zone each having a natural rate of vibration differing from others in said zone, and a magnet in inductive relation to said tongues.

8. In an acoustical instrument, a circular diaphragm having zones of freely vibratory tongues extending from an inner portion of the diaphragm to the margin thereof, and of different lengths and widths and having correspondingly different natural rates of vibration, and electro-magnetic means in inductive relation to said tongues.

9. In an acoustical instrument, a circular diaphragm having substantially segmental zones of freely vibratory tongues having their free ends at the periphery of the diaphragm, said zones describing in the central portion of the diaphragm a substantially regular geometric figure wherein the diaphragm is solid or unbroken by tongues, the tongues in a zone having each individually different natural rates of vibration from others in the same zone, and electro-magnetic means in inductive relation to said tongues.

10. In a telephone receiver, a diaphragm having its marginal portion wholly free and unsupported, a centrally located circuit controlling means connected to the diaphragm, a support for the diaphragm between the centrally located circuit controlling means and the free periphery of the diaphragm, and an induction coil in inductive relation to the free marginal portions of the diaphragm, said induction coil having a winding adapted to be connected to line, and another winding connected to the circuit controller.

11. In a telephone receiver, a circular diaphragm provided with a series of peripheral tongues of varying length and varying width, means for supporting the diaphragm interior to the tongues, and a magnet disposed near the periphery of the diaphragm for acting on said tongues.

12. In a telephone receiver, a circular diaphragm provided with a series of peripheral tongues of varying length and of varying width, a magnet disposed near the periphery of the diaphragm for acting on said tongues, said magnet comprising a soft iron core, and a pair of separate windings in inductive relation, and means for supplying current to each of said windings.

13. In a telephone system, a receiver provided with a circular diaphragm having a series of peripheral tongues of varying length and of varying width, means for supporting the central portion of the diaphragm, a magnet disposed near the periphery of the diaphragm for acting on said tongues and comprising a soft iron core, and a pair of separate windings, a local circuit connected with one of said magnet windings, and a main line circuit connected with the other of said windings.

14. In a telephone system, a telephone receiver, a casing, a microphonic transmitter carried by said casing, a diaphragm connected with said transmitter, a magnet within said casing comprising a ring-shaped iron core, a pair of separate windings on said core and located adjacent the periphery of the diaphragm, a line circuit connected with one of said windings, and a local circuit including the transmitter and connected with the other of said windings.

15. In a telephone system, a telephone receiver, a casing provided with a recess, a spool arranged to enter the recess in said casing, and in turn provided with a central recess, a microphonic transmitter disposed in the central recess of the spool, an annular soft iron core carried by said spool, two independent sets of windings about said core, one of said windings being connected with the transmitter, a local circuit connected to the last named winding, a line circuit connected to the other winding, and a diaphragm supported near its central portion and connected with the transmitter, the periphery of the diaphragm being adjacent the windings of the magnet.

16. In a telephone system, a telephone receiver, a casing provided with a recess, a spool arranged to enter the recess in the casing and in turn provided with a central recess, a microphonic transmitter disposed in the central recess of the spool, an annular soft iron core carried by the spool, two independent sets of windings about said core, one of said windings being connected with the transmitter, a local circuit connected to the last named winding, a line circuit connected to the other winding, a diaphragm supported near its central portion and connected with the transmitter, the periphery of the diaphragm being adjacent the windings of the magnet, and a screw cap for the casing adapted to hold the spool in place and provided with a recess arranged to receive the diaphragm.

17. In a telephone system, a telephone receiver, a casing provided with a recess, a spool arranged to enter the recess in the casing and in turn provided with a central recess, a microphonic transmitter disposed in the central recess of the spool, an annular soft iron core carried by said spool, two independent sets of windings about said core, one of said windings being connected with the transmitter, a local circuit connected to the last named winding and the transmitter and including a battery, a line circuit connected to the other winding of the magnet, an induction coil having one winding in parallel with the line winding and the other winding included in the local circuit, and a diaphragm supported near its central portion and connected with said transmitter, the periphery of the diaphragm being adjacent the windings of the magnet.

18. In an acoustical instrument, a diaphragm supported between its marginal and central portions with said support spaced from the center of the diaphragm to provide vibratory portions both interior and exterior to the support and the exterior or marginal portions of the diaphragm being wholly free, and a magnet in operative relation to the free marginal portion of the diaphragm.

19. In an acoustical instrument, a diaphragm supported between its marginal and central portions with said support spaced from the center of the diaphragm to provide vibratory portions both interior and exterior to the support and the exterior or marginal portions of the diaphragm being wholly free, and a magnet in operative relation to the free marginal portion of the diaphragm, said magnet comprising an annular core and a winding therefor.

20. In an acoustical instrument, a diaphragm having a wholly free marginal portion and supported interior to such free portion at a distance from the center of the diaphragm to provide a vibratory portion of the diaphragm between its center and the support, and a magnet having a core and winding exterior to the supported portion of the diaphragm and in inductive relation to the free marginal portion of said diaphragm.

21. In an acoustical instrument, a diaphragm having the marginal portion wholly free and locally tuned to respond to different chosen rates of vibration, and electromagnetic means in position with respect to the said tuned portion of the diaphragm to act inductively thereon.

22. In an acoustical instrument, a circular diaphragm having its marginal portions locally tuned to respond to different rates of vibration, and electro-magnetic actuating means local to said tuned marginal portions.

23. An acoustical instrument having a diaphragm with its marginal portions in a plurality of zones locally tuned to respond to different rates of vibration, and electromagnetic actuating means local to said tuned marginal portion.

24. An acoustical instrument having a diaphragm of circular form with connected segmental zones of the marginal portion slit from the periphery toward the central portion to extents defining a substantially equisided triangular portion unentered by the slits, each series of slits being arranged substantially radial to the apex of the triangle remote from the slits, and electro-magnetic actuating means local to the slit marginal portion of the diaphragm.

25. An acoustical instrument having a diaphragm of circular form with connected segmental zones of the marginal portion slit from the periphery toward the central portion to extents defining a substantially equilateral triangular portion unentered by the slits, each series of slits being arranged substantially radial to the apex of the triangle remote from the slits, and said diaphragm being provided with supporting means engaging the diaphragm in the unslit portion, and electro-magnetic actuating means local to the slit portions of the diaphragm.

26. An acoustical instrument having a diaphragm of circular form with connected segmental zones of the marginal portion slit from the periphery toward the central portion to extents defining a substantially equilateral triangular portion unentered by the slits, each series of slits being arranged substantially radial to the apex of the triangle remote from the slits, and said diaphragm being provided with supporting means engaging the diaphragm in the unslit portion, said supporting means being arranged to pierce the diaphragm in substantially the lines of the perpendicular bisectors of the triangle, and electro-magnetic means local to the slit portion of the diaphragm.

27. An acoustical instrument provided with a plurality of vibratory parts each movable about an intermediate support, electro-magnetic means in inductive relation to one end of each vibratory part, and means actively connected to the other end of the vibratory parts and responsive to vibrations imparted thereto to augment the inductive effect of the electro-magnetic means upon said vibratory parts.

28. An acoustical instrument provided with a plurality of vibratory parts each movable about an intermediate support, electro-magnetic means in inductive relation to one end of each vibratory part, and means actively connected to the other end of the vibratory parts and responsive to vibrations imparted thereto to augment the inductive effect of the electro-magnetic means upon said vibratory parts, the vibratory parts at the ends in inductive relation to the electro-magnetic means being tuned to respond to different rates of vibration.

29. A telephone receiver having a diaphragm for translating electric undulations transmitted over the line into sounds, means free from permanent magnetism and controlled by the diaphragm for maintaining an electro-magnetic field in operative relation to the diaphragm independent of the telephone line currents and constituting the sole magnetic field of the receiver, and means for causing modifications of such electromagnetic field by and in accordance with the telephone line currents.

30. A telephone receiver having a diaphragm for translating electric undulations transmitted over the line into sounds, means free from permanent magnetism and controlled by the diaphragm for maintaining an electromagnetic field in operative relation to the diaphragm independent of the telephone line currents and constituting the sole magnetic field of the receiver, and means for causing modifications of such electromagnetic field by and in accordance with the telephone line currents, the last-named means being in inductive relation to the means for producing the magnetic field and both of said means being located in a zone intermediate of the central and peripheral portions of the diaphragm.

31. A telephone receiver provided with a sound producing diaphragm and a circuit local to the telephone receiver and controlled by the diaphragm and including a source of direct current, said local circuit being provided with means producing a magnetic field in proximity to and constituting the sole magnetic field active to the diaphragm.

32. A telephone receiver having a diaphragm and an induction coil in inductive relation thereto, one winding of the coil being adapted for energization by direct current, and the other winding being adapted to receive telephonic line currents, and a microphonic element in operative relation to the diaphragm on the same side thereof as and connected to the winding energized by direct current, the microphonic element being located in operative relation to the central portion of the diaphragm, and the induction coil being in operative relation to an outer portion of the diaphragm and said diaphragm having supporting means located between the induction coil and the microphonic element.

In testimony, that I claim the foregoing as my own, I have hereto affixed my signature in the presence of two witnesses.

ANDREW PLECHER.

Witnesses:
H. FREY,
P. G. SCOTT.